United States Patent [19]

Kieves

[11] Patent Number: 4,917,646
[45] Date of Patent: Apr. 17, 1990

[54] SELF-SEALING VALVE, A SELF-SEALING, NON-LATEX BALLOON, AND A METHOD FOR PRODUCING SUCH A BALLOON

[76] Inventor: Garry Kieves, 3517 W. 38th St., Minneapolis, Minn. 55410

[21] Appl. No.: 233,156

[22] Filed: Aug. 17, 1988

[51] Int. Cl.⁴ .................... A63H 27/10; F16K 15/16; B32B 31/00
[52] U.S. Cl. .................... 446/224; 137/846; 137/850; 156/289
[58] Field of Search .............. 446/224, 220; 137/846, 137/844, 850, 512.15, 512.4, 223, 853, 855; 156/289, 293, 308.4; 244/31, 33; 383/44, 49

[56] References Cited

U.S. PATENT DOCUMENTS

| | | | |
|---|---|---|---|
| 1,169,804 | 2/1916 | Gregory | 446/224 |
| 1,702,974 | 2/1929 | MacDonald | 446/222 X |
| 2,674,064 | 4/1954 | Gassaway | 446/224 |
| 2,700,980 | 2/1955 | Andrews | 446/220 X |
| 3,230,663 | 1/1966 | Shabram | 446/224 |
| 3,332,415 | 7/1967 | Ericson | 446/220 X |
| 3,491,791 | 1/1970 | Polk | 137/525.1 |
| 3,664,058 | 5/1972 | Brieske | 446/224 |
| 4,674,532 | 6/1987 | Koyanagi | 446/224 X |

FOREIGN PATENT DOCUMENTS 4711269 7/1974 Japan .
47134446 8/1974 Japan .
59-46278 10/1985 Japan .

Primary Examiner—Mickey Yu
Attorney, Agent, or Firm—Allegretti & Witcoff, Ltd.

[57] ABSTRACT

The present invention relates to a self-sealing flexible plastic valve for a non-latex balloon. The valve is made from two flexible plastic sheets, bonded together to define a valve inlet, a valve outlet and a valve passageway. The inlet end of one sheet extends beyond the other to provide a positioning tab to be bonded to the balloon sheet such that the valve inlet is within the balloon stem. A bonding barrier at the inlet end avoids sealing during fabrication and facilitates automated insertion of the valve into the balloon.

14 Claims, 5 Drawing Sheets

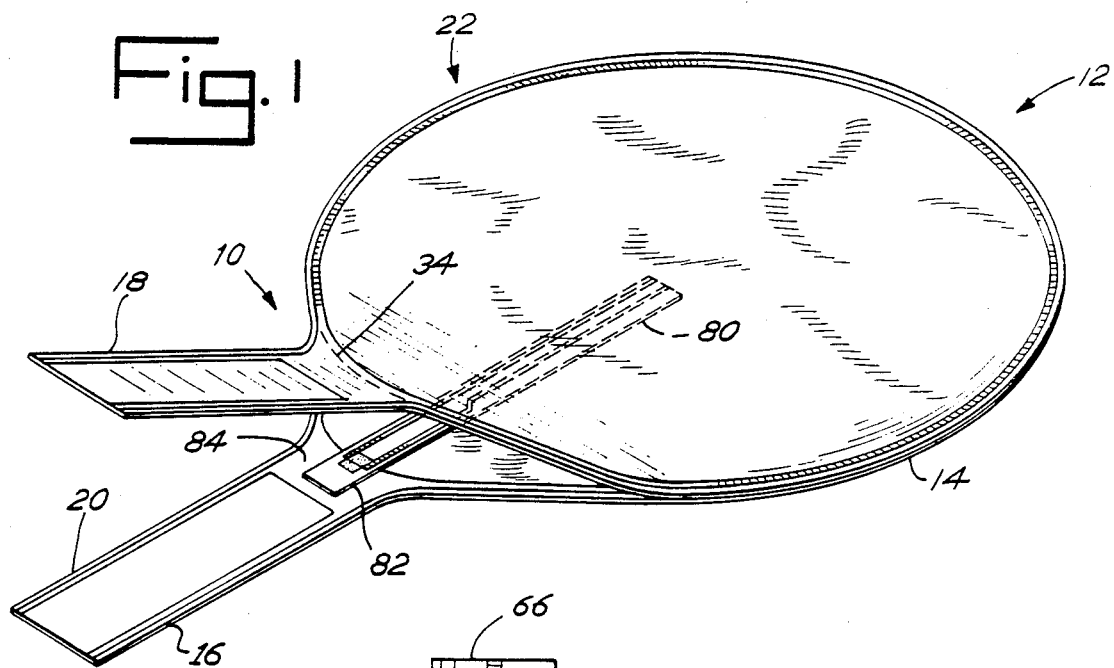
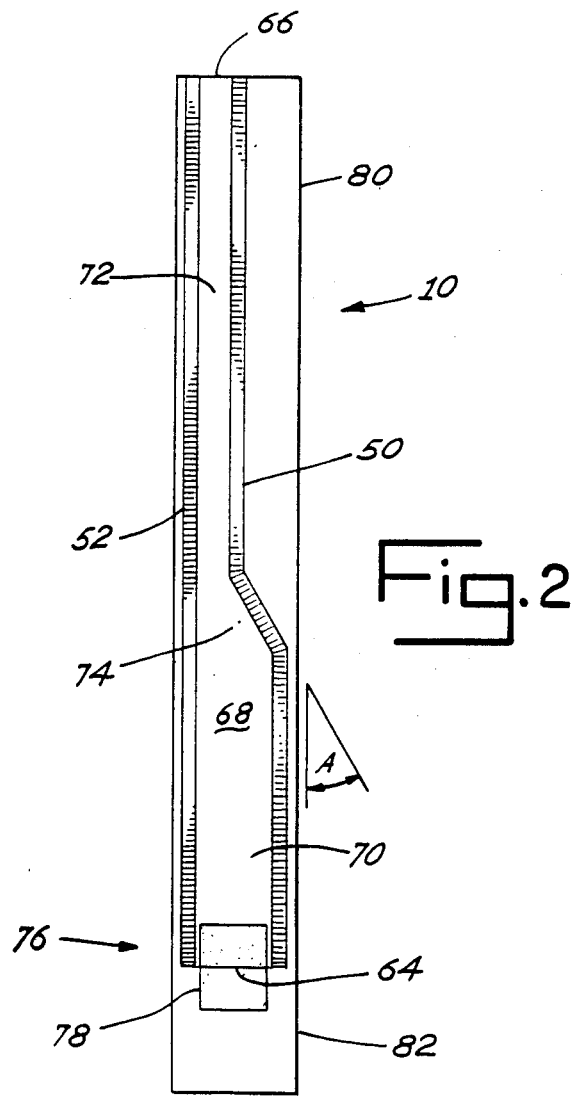

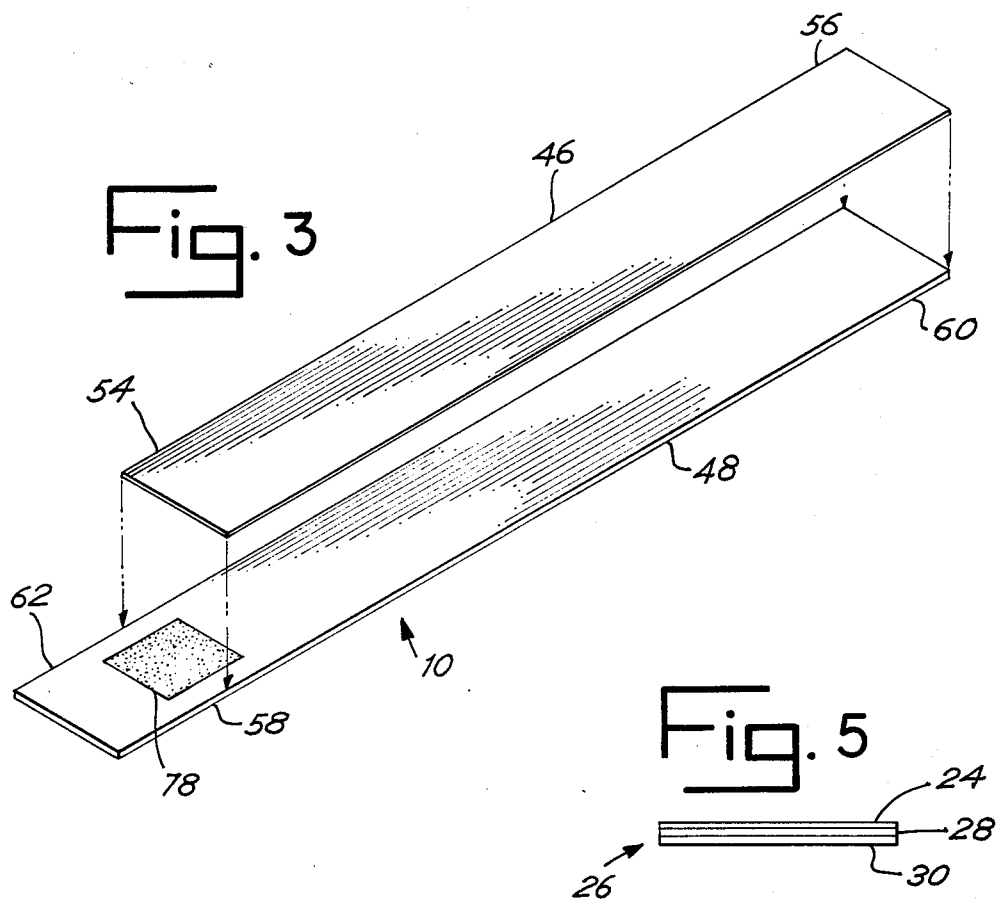
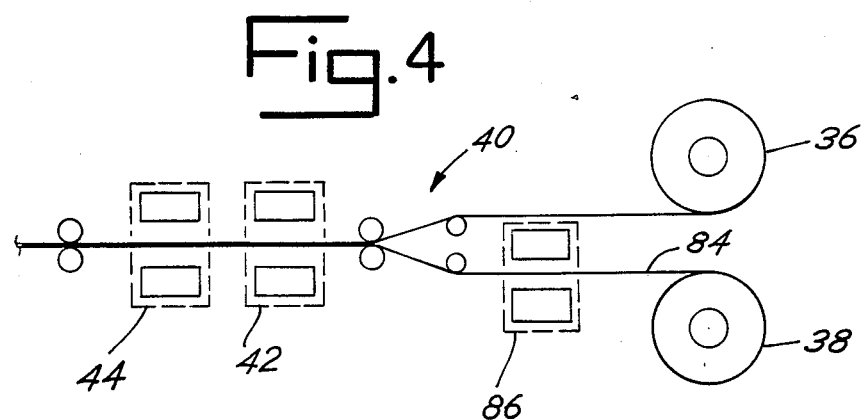

SELF-SEALING VALVE, A SELF-SEALING, NON-LATEX BALLOON, AND A METHOD FOR PRODUCING SUCH A BALLOON

BACKGROUND OF THE INVENTION

The present invention relates generally a self-sealing, non-latex balloon and a method for manufacturing such balloons, and more specifically to a self-sealing valve mechanism for a non-latex balloon. As used herein, the term "balloon" refers to any inflatable toy having a body and an inflation stem.

The popularity of non-latex balloons has grown tremendously over the past five years. This type of balloon includes two flexible plastic sheets which are heat-sealed together in many different configurations (e.g., a circle or heart shape). One or both of the sheets may be decorated or metallized to provide an aesthetically-pleasing balloon.

Since non-latex balloons are highly impermeable, sealing of the balloon stem is critical to extended inflated life. A well-sealed non-latex balloon may remain virtually fully inflated for several weeks even when the inflation fluid is helium.

Until recently, non-latex balloons were filled with air or helium to the desired pressure using a pump mechanism and then sealed by (i) a tightly-tied string, (ii) a clip or cup assembly adapted to crimp the balloon stem, or (iii) heat sealing. The disadvantages of these three systems are self-evident.

The string provides only a marginal seal and can be difficult to apply in the field. Refilling of the balloon is also cumbersome. The clip and cup assemblies add a significant incremental cost and cannot be effectively utilized with helium-filled balloons. Furthermore the balloon stem is often damaged during an attempt to refill the balloon. Heat saling provides a virtually permanent seal, but completely eliminates the ability to refill the balloon. It also requires a heat-sealing mechanism and an appropriate power supply. In addition, proper use of the presently available heat sealing mechanisms requires training and practice.

Recently the non-latex balloon industry has sought to develop a self-sealing balloon and valve mechanism. The objectives have always been clear: reliability, minimal cost, ease of valve fabrication, and simplicity of incorporation into the balloon production system. To-date, several valves formed from two flexible plastic sheets have been made, but despite the efforts of many, each suffers from one or more serious disadvantages. These disadvantages include unacceptably high failure rates, costly fabrication procedures, and difficulty incorporating the valve insertion step into the balloon-manufacturing process.

In addition, all presently available self-sealing valves extend beyond the balloon stem with the two plastic valve sheets being coterminous. Several problems therefore exist.

First, the valve itself is exposed and subject to damage, e.g., by puncture through engagement with the inflation mechanism. Second, the size of the valve is less than that of the conventional balloon stem so as to require an adaptor for convention pump mechanisms. Third, the valve sheets are difficult to fully separate such that interference with the inflation process is often experienced.

Three examples of presently available self-sealing valves are shown herein.

SUMMARY OF THE INVENTION

The present invention relates to a self-sealing valve for use in conjunction with a non-latex balloon and extends to a balloon incorporating such a selfsealing valve and a method of manufacture. The valve itself includes two flexible plastic valve sheets secured together to define a valve inlet, valve outlet and valve passageway. One of the valve sheets extends beyond the other at the valve inlet to provide a positioning tab, which substantially facilitates automation of the valve insertion process.

The self-sealing valve fits entirely within the balloon, partially within the stem and partially within the body thereof. During assembly of the balloon, the positioning tab and the valve inlet, i.e., the valve portion within the stem, are bonded or fused to the interior surfaces of the balloon sheets. This substantially avoids potential valve damage and potential interference during inflation since there are no free ends or edges of the self-sealing valve exposed to the inflation mechanism.

The two flexible plastic valve sheets also define, in the region of the valve inlet, a bonding barrier. This avoids the complete or partial closing of the valve inlet during assembly of the balloon or, more particularly, as the balloon sheets are bonded together and to the self-sealing valve.

It is thus an object of the present invention to provide a self-sealing, non-latex balloon. Another object is to provide a non-latex balloon with a reliable self-sealing valve mechanism. It is also an object to provide a self-sealing valve for a non-latex balloon which may be readily incorporated into the balloon assembly process. Still another object of the present invention is an inexpensive, mass-producible, self-sealing balloon valve. An additional object is a self-sealing, non-latex balloon which may be fitted by conventional mechanisms without use of a special adaptor.

It is yet another object of the present invention to provide a method for fabricating a self-sealing, non-latex balloon. A further object is to provide a method for fabricating a non-latex balloon having a self-sealing valve wherein the stem portion of the valve is bonded or fused such that there are no free ends or edges. It is also an object to provide a non-latex, self-sealing balloon wherein the stem portion of the valve is not exposed and does not interfere with the balloon-filling process.

These and other features, objects and advantages of the present invention are described or implicit in the following detailed description.

BRIEF DESCRIPTION OF THE DRAWING

A preferred embodiment of the present invention is described herein with reference to the drawing wherein:

FIG. 1 is a perspective view of a metallic-coated, non-latex balloon including a preferred embodiment of the self-sealing valve, illustrating the extent of bonding with one balloon sheet peeled away solely for illustrative purposes;

FIG. 2 is an enlarged top view of the valve of FIG. 1;

FIG. 3 is an enlarged perspective view of the bonded sheets of the valve shown in FIGS. 1 and 2;

FIG. 4 is a schematic view of an apparatus for fabricating the non-latex balloon of FIG. 1;

FIG. 5 is a greatly enlarged cross-sectional view of one balloon sheet shown in FIG. 1;

DETAILED DESCRIPTION OF A PREFERRED EMBODIMENT

Figure 6:
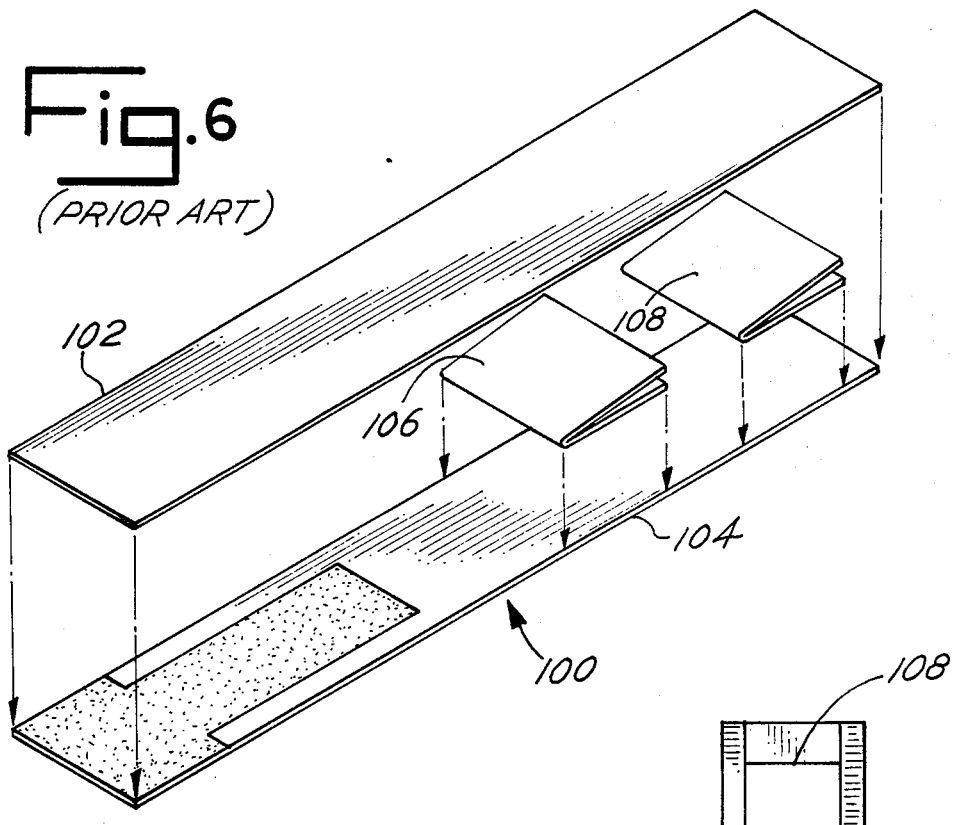
FIGS. 6 and 6A illustrate one known self-sealing valve in exploded perspective and top views, respectively.

A preferred embodiment of the present invention is shown as a self-sealing valve 10 for a metallic-coated, non-latex balloon 12. As is well known in the art, the balloon 12 includes a body 14 and a stem 16, defined by two flexible plastic balloon sheets 18, 20 of a metallic-coated, heat-sealable material 22. As best shown in FIG. 5, each balloon sheet 18, 20 includes a thin metallic coating 24 applied to a plastic sheet 26, which includes a layer of nylon 28 and a layer of polyethylene 30. The polyethylene layers 30 are sealed or fused together by application of heat along a substantially peripheral heat-seal line 32.

The body 14 of the balloon 12 is inflatable with an inflation fluid, such as air or helium, through the stem 16. For purposes hereof, the stem 16 extends from a boundary 34, shown as a dashed line in FIG. 1 and defined by a relatively smooth, continuous extension of the heat-seal line 32 in the region of the stem 16.

With particular reference to FIG. 4, the heat-sealable material 22 is provided in roll form with a width three (3) feet. Two rolls 36, 38 are utilized to produce the balloon 12 or more particularly the two balloon sheets 18, 20. After printing, the two rolls 36, 38 are aligned, registered and ultimately brought together by a series of rollers, generally designated 40. The balloon 12 is formed by a heat-sealing dye 42 and a cutting dye 44, as is well known in the art.

As best shown in FIGS. 2 and 3, the valve 10 includes first and second flexible plastic valve sheets 46, 48, sealed or fused along two longitudinal edge lines 50, 52. Preferably the first and second sheets 46, 48 are low density polyethylene (for example, as producible from the resin "ELVAX 3120" marketed by DuPont E I De Nemours & Co). The first and second sheets 46, 48 have a thickness in the range of one (1.0) to three (3.0) mils. In this preferred embodiment, the first sheet 46 is one and one-half (1.5) mils., and the second sheet 48 is two (2.0) mils.

The first sheet 46 is substantially rectangular and has a first inlet end 54 and a first outlet end 56. The second sheet 48 is also substantially rectangular, having a second inlet end 58 and a second outlet end 60. As shown, the second sheet 48 is preferably longer than the first sheet 46. More importantly, the second inlet end 58 extends beyond the first inlet end 54 in the assembled valve state, as best shown in FIG. 2, so as to define a positioning tab 62.

In the assembled valve state, the first and second valve sheets 46, 48 cooperate to define a valve inlet 64, valve outlet 66 and valve passageway 68 extending therebetween. The valve passageway 68 preferably includes an inlet section 70 extending from the valve inlet 64, an outlet section 72 extending from the valve outlet 66, and an interconnecting offset section 74. As shown, the outlet section 72 has a width corresponding to the width of the valve outlet 66, and the inlet section 70 has greater width corresponding to that of the valve inlet 64. The offset section 74 provides a relatively smooth transition between the inlet and outlet sections 70, 72 and defines an offset angle, designated "A" on FIG. 2, in the range of fifteen (15) to forty (40) degrees. The offset angle "A" is preferably twenty (20) degrees.

The valve 10 also includes barrier means, generally designated 76. The barrier means 76 provides a bonding barrier at the valve inlet 64, such that the inlet 64 is not sealed or closed during the balloon assembly process.

In this preferred embodiment, the barrier means 76 is a coating 78 of heat-resistant nitrocellulose ink, applied to the second sheet 48. The ink coating 78 extends across the width of the second sheet 48 between the two longitudinal edge lines 50, 52. The longitudinal extent of the ink coating 78 must be sufficient, based upon valve and balloon assembly tolerances, to ensure that the first inlet end 54 of the first valve sheet 46 overlaps the ink coating 78.

As shown in FIG. 1, the valve 10 lies entirely within the balloon 12. That is, a first portion 80 of the valve 10 extends into the body 14 and is substantially free or floating. This floating portion 80 facilitates sealing under pressure in that the floating portion 80 often partially folds over to crease the valve passageway 68.

A second portion 82 of the valve 10 extends beyond the boundary 34 and partially into the stem 16. This second portion 82 includes the positioning tab 62 and valve inlet 64 and is preferably completely bonded to the balloon stem 16 in the final assembled balloon state. In this preferred embodiment, heat sealing integrally fuses the second portion 82 of the valve 10 to the balloon sheets 18, 20.

Fusion thereof substantially facilitates inflation of the balloon 12 by conventional mechanisms. First, fusion of the positioning tab 62 and valve inlet 64 eliminates any free end or edge of the valve 10 within the balloon stem 16. This substantially avoids valve interference with the inflation process.

Second, the flexible plastic sheets 46, 48 of the valve 10 are not directly exposed to the inflation equipment and puncture thereof is substantially avoided. The fused positioning tab 62 and valve inlet 64 also thicken and reinforce the flexible balloon sheets 18, 20 in the region of the boundary 34, offering further protection against puncture.

Third, the fused positioning tab 62 and valve inlet 64, in conjunction with the floating portion 80, cooperate to "snap open" the valve 10 under initial inflation pressure. The valve inlet 64 opens as the inflation mechanism is inserted into the balloon stem 16, and the inflation fluid readily passes through the valve passageway 68 emerging from the valve outlet 66 into the balloon body 14.

Finally, the valve 10 does not reduce in any way the size of the balloon stem 16. As such, no adaptor is needed for the conventional inflation equipment.

During assembly of the balloon 12, the valve 10 is secured to an interior surface 84 of the polyethylene layer 30 of the balloon sheet 20. More particularly, the valve 10 is properly placed upon the interior surface 84, and the positioning tab 62 is preferably completely fused thereto by a second heat sealing dye 86. The first and second balloon sheets 18, 20 are then heat-sealed together and to the valve 10. This heat seal extends about the entire periphery of the body 14 and along the edges of the stem 16. It also extends along the boundary 34 such that the balloon sheets 18, 20 are sealingly bonded to the first and second valve sheets 46, 48, respectively, integrally fusing the valve inlet 64 to the balloon stem 16 without closure thereof.

For a conventional eighteen (18) inch non-latex balloon 12 to be filled with helium to a pressure of approximately three quarters (¾) of a pound per square inch, the valve 10 is preferably seven (7) inches in total length and one (1) inch in total width, with a one-half (½) inch positioning tab 62. The widths of the inlet and outlet sections 70, 72 are three-quarters (¾) and seven-sixteenths (7/16) inch, respectively. Preferably the ink coating 80 extends one (1) inch.

Figure 6A:
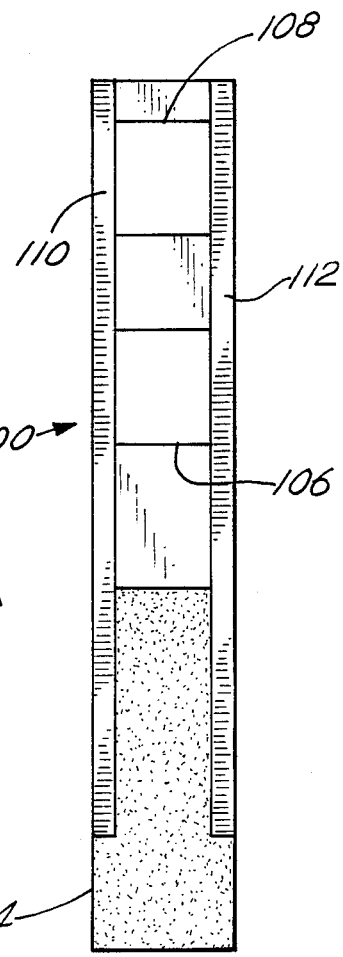

One presently available self-sealing valve, generally designated 100, is shown in FIGS. 6 and 6A. The valve 100 includes two heat-sealed sheets 102, 104 and two plastic V-shaped inserts 106, 108, respectively. Each insert 106, 108 is a single plastic sheet folded over to provide the V-shape and positionally maintained by the side heat seals 110, 112. The sheets 102, 104 are coterminous at both ends, i.e., neither sheet 102 nor 104 extends above the other at either end.

At an inlet end 114, the sheet 104 is coated. This avoids sealing of the inlet end 114 during placement of the valve 100 into a balloon (not shown).

Figure 7:
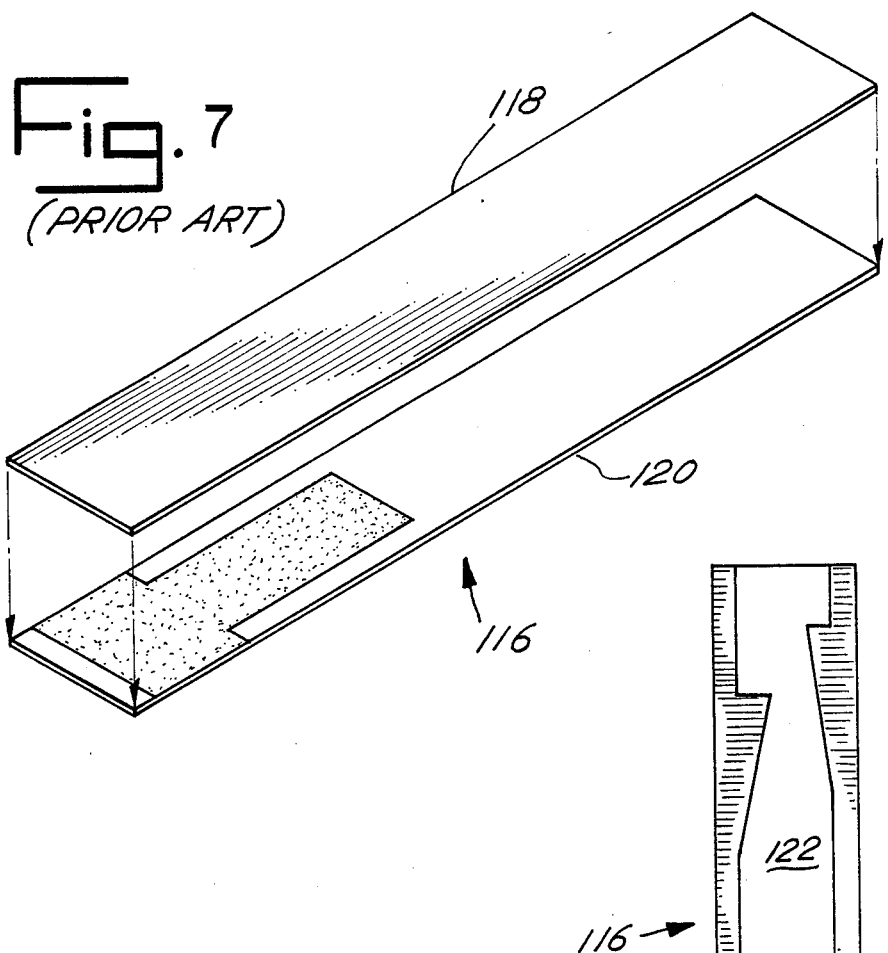
FIGS. 7 and 7A illustrate a second known self-sealing valve in exploded perspective and top views, respectively.
Figure 7A:
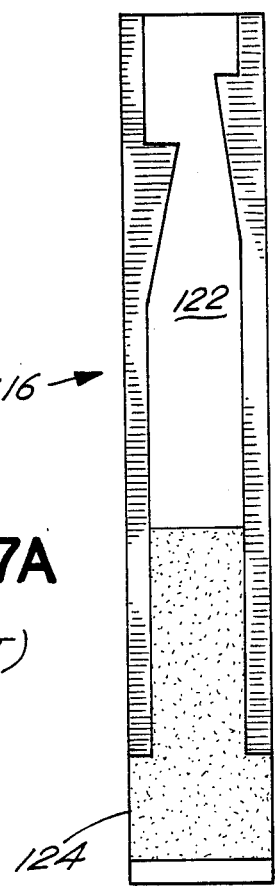

A second available valve 116 is shown in FIGS. 7 and 7A. The valve 116, including flexible plastic sheets 118, 120, defines an irregular passageway 122. The sheets 118, 120 are coterminous at both ends, and the sheet 120 is coated in an inlet region 124.

Figures 8, 8A:
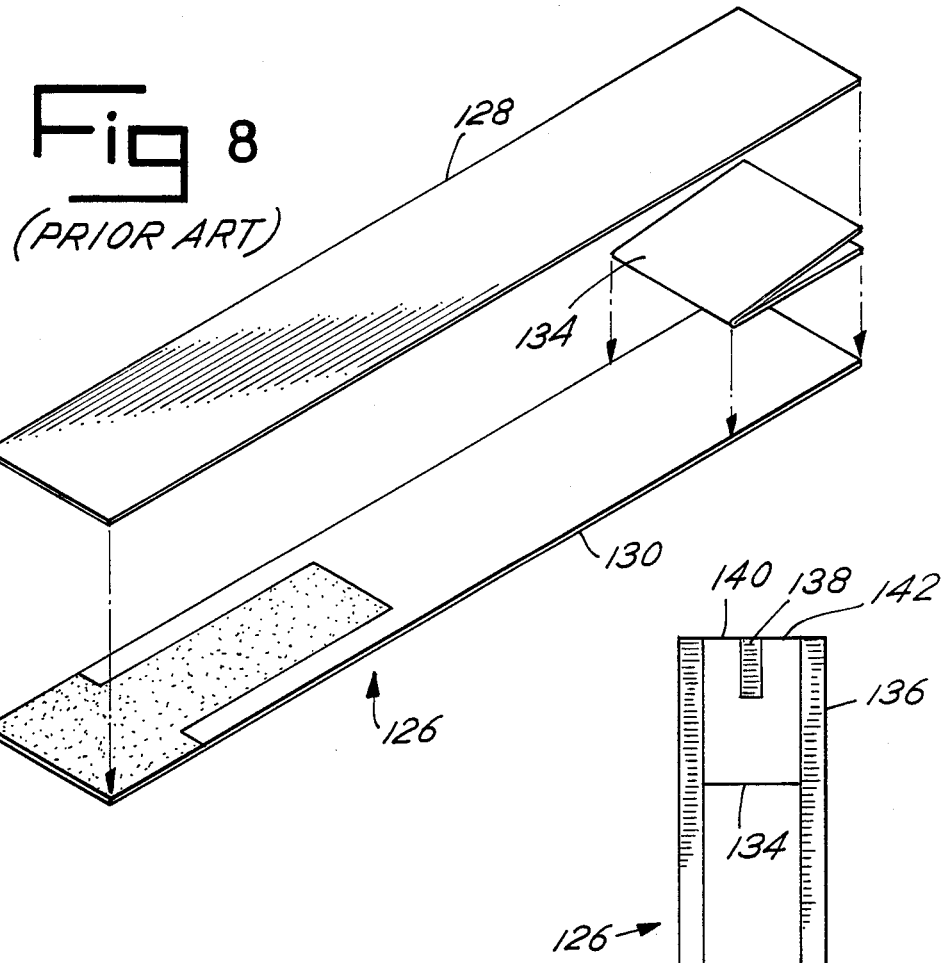
FIGS. 8 and 8A illustrate a third known self-sealing valve in explosed perspective and top views, respectively.

A third valve 126 is shown in FIGS. 8 and 8A. This is a variation of the valve shown and described in U.S. Pat. No. 4,672,532.

The valve 126 includes two heat-sealed plastic sheets 128, 130, wihch are coterminous at both ends. The sheet 130 is coated at an inlet end 132 to avoid closing the valve 126 during incorporation into a balloon (not shown).

The valve 126 includes a V-shape insert 134 at an outlet end 136. The insert 134 is heat-sealed along an intermediate strip 138 so as to provide two outlet ports 140, 142, respectively.

A preferred embodiment of the present invention has been described herein. It is to be understood that modifications and changes can be made without departing from the true scope and spirit of the present invention, which are defined by the following claims to be interpreted in view of the foregoing description.

What is claimed is:

1. A self-sealing valve, for use with a non-latex balloon having a stem and a body, comprising, in combination:
    a first flexible plastic valve sheet having a first inlet end and a first outlet end;
    a second flexible plastic valve sheet having a second inlet end and a second outlet end;
    said first and second flexible plastic valve sheets being secured together and defining a valve inlet and a valve outlet; and
    barrier means for providing a bonding barrier between said first and second flexible plastic valve sheets at said valve inlet;
    said second inlet end of said second flexible plastic valve sheet extending beyond said first inlet end of said first flexible plastic valve sheet to provide a positioning tab to be secured within said stem of said non-latex balloon;
    said self-sealing valve extending from said stem into said body and lying entirely within said non-latex balloon when said self-sealing valve is secured within said stem.

2. A self-sealing valve as claimed in claim 1 wherein said first and second flexible plastic valve sheets further define a valve passageway between said valve inlet and said valve outlet, said valve passageway including an offset section.

3. A self-sealing valve as claimed in claim 1 wherein said barrier means is a coating of heat-resistant ink.

4. A self-sealing valve as claimed in claim 3 wherein said coating of heat-resistant ink is applied to said second flexible plastic valve sheet.

5. A self-sealing, non-latex balloon having a body and a stem comprising, in combination:
    a first balloon sheet having an interior surface;
    a second balloon sheet bonded to said first balloon sheet so as to define said body and said stem; and
    a self-sealing valve having a first floating portion within said body and a second portion bonded to said first and second balloon sheets within said stem, said self-sealing valve including a first flexible plastic valve sheet bonded to a second flexible plastic valve sheet so as to provide a positioning tab and a valve inlet defining said second portion, said positioning tab being initially bonded to said interior surface of said first balloon sheet at a predetermined position and orientation with respect thereto;
    said valve inlet being bonded to said first and second balloon sheets within said stem;
    said self-sealing valve further including barrier means for providing a bonding barrier between said first and second flexible plastic valve sheets at said valve inlet.

6. A self-sealing, non-latex balloon as claimed in claim 5 wherein said self-sealing valve includes a valve passageway having an inlet section, an outlet section, and an offset section.

7. A self-sealing, non-latex balloon as claimed in claim 5 wherein said barrier means is a coating of heat-resistant ink.

8. A self-sealing, non-latex balloon as claimed in claim 7 wherein said coating of heat-resistant ink is applied to said second flexible plastic valve sheet.

9. A self-sealing, non-latex balloon as claimed in claim 5 wherein said second portion of said self-sealing valve is fused to said stem by heat sealing.

10. A method for producing a self-sealing, non-latex balloon, having a body and a stem defined by a first balloon sheet bonded to a second balloon sheet, comprising the steps of:
    bonding a first flexible plastic valve sheet to a second flexible plastic valve sheet so as to provide a valve having a valve inlet, a valve outlet, and a positioning tab;
    treating at least one of said first and second flexible plastic valve sheets to provide barrier means for providing a bonding barrier between said first and second flexible plastic valve sheets at said valve inlet;
    bonding said positioning tab to said first balloon sheet at a predetermined position such that said valve has a predetermined orientation with respect to said first balloon sheet;
    registering said second balloon sheet with respect to said first balloon sheet; and bonding said first and second balloon sheets together and to said valve such that said valve includes a first floating portion within said body and a second portion bonded to said balloon stem, said second portion including said positioning tab and said valve inlet.

11. A method as claimed in claim 10 further including the step of forming a valve passageway between said valve inlet and said valve outlet, said valve passageway having an offset section.

12. A method as claimed in claim 10 wherein the step of treating said first and second flexible plastic valve sheet includes coating thereof with a heatresistant ink.

13. A method as claimed in claim 10 wherein said steps of bonding include applying heat to form a fused heat seal.

14. A self-sealing, non-latex balloon having a body and a stem comprising, in combination:
 a first balloon sheet having an interior surface;
 a second balloon sheet bonded to said first balloon sheet so as to define said body and said stem; and
 a self-sealing valve having a first floating portion within said body and a second portion heat-fused to said first and second balloon sheets within said stem, said self-sealing valve including a first flexible plastic valve sheet, having a thickness in the range of one (1.0) to two (2.0) mil, bonded to a second flexible plastic valve sheet, having a thickness in the range of one (1.0) to two (2.0) mils, so as to provide a positioning tab and a valve inlet defining said second portion, said positioning tab being initially bonded to said interior surface of said first balloon sheet at a predetermined position and a predetermined orientation with respect thereto;
 said valve inlet being bonded to said first and second balloon sheets within said stem;
 said self-sealing valve further including a bonding barrier of heat-resistant ink applied to at least one of said first and second flexible plastic valve sheets at said valve inlet;
 said self-sealing valve further defining a valve passageway having an inlet section, an outlet section and an offset section, such that said inlet section has a width greater than said outlet section.

* * * * *